United States Patent [19]

Woolfson

[11] 3,769,456

[45] Oct. 30, 1973

[54] METHOD AND SYSTEM FOR CENTROIDAL TV TRACKING

[75] Inventor: Martin G. Woolfson, Baltimore, Md.

[73] Assignee: Westinghouse Electric Corporation, Pittsburgh, Pa.

[22] Filed: Jan. 21, 1972

[21] Appl. No.: 219,736

[52] U.S. Cl. .......................... 178/6.8, 178/DIG. 21

[51] Int. Cl. .......................... H04n 7/18

[58] Field of Search .......................... 178/DIG. 21, 6.8

[56] References Cited

UNITED STATES PATENTS

| | | | |
|---|---|---|---|
| 3,513,318 | 5/1970 | Birnbaum | 178/DIG. 21 |
| 3,541,246 | 11/1970 | Goldfischer | 178/DIG. 21 |
| 3,541,249 | 11/1970 | Chambers | 178/DIG. 21 |

*Primary Examiner*—Howard W. Britton
*Attorney*—F. H. Henson et al.

[57] ABSTRACT

A mechanization employing digital techniques locates and tracks the centroid of an image produced by television (TV) scanning techniques. The TV video signal is processed for changes in level, corresponding to contrast differences between an image and background, and all level changes are stored digitally with coordinate information related to vertical and horizontal positions. Each level change is weighted as a function of displacement from the coordinate axes and summed each scan frame to yield the mean of all level changes recorded. The image as a target is tracked by sensing, digitally, the change of position of the image mean level-change, or centroid, in subsequent TV frames and providing positioning information to the TV camera tracking servomechanism so as to center the image on the TV display.

18 Claims, 9 Drawing Figures

METHOD AND SYSTEM FOR CENTROIDAL TV TRACKING

BACKGROUND OF THE INVENTION

1. Field of the Invention

The invention relates to TV signal processing and tracking of a TV display target, and, more particularly, to an improved method and system for the recognition of a target within the video display of a TV camera and area tracking thereof through use of digital techniques.

2. State of the Prior Art

The prior art of electronic tracking relates to so-called "edge" trackers which utilize a small region in the display (called a track window) to provide tracking information. The video signal occurring within the track window is differentiated and thresholded so that contrast gradients exceeding a preset magnitude determine the track points. In the sense that a target is discerned relative to a given background by a change in contrast, the typical edge tracker utilizes this contrast change to outline the desired target and track this outline or target "edge."

Two difficulties arise in this procedure. First, since differentiation is typically restricted to gated horizontal signals (i.e., differentiation of gated video on each TV horizontal sweep or TV line), targets which are of larger extent than the track window and parallel to the horizontal datum provide no track information. Second, since the tracker must contain a corner within the track window, it continues to indicate an error until a corner is reached. An example of this effect is noted when the tracker locks-on to a picture of a road or cloud edge and is committed to follow this edge until the track window reaches its excursion limits.

Further, the edge tracker is constrained so as to center the track window on an edge discontinuity located on the periphery of the given traget. With small perturbations induced by video noise or target glint, the track point may change, causing the track window to travel around the target periphery. This action continues until either a different edge discontinuity occurs or capture takes place due to a clutter signal appearing within the track window. Except for a point target, the edge tracker cannot center on any given target and the track point is always dependent on the target geometry. As a consequence, target roll rate is sensed as a function of which edge is being tracked and the relative size of the target within the field of view. If the initially tracked edge is occluded by the target as the target undergoes a roll maneuver, a new tracking edge is required and break lock may result.

SUMMARY OF THE INVENTION

The centroidal TV tracker of the invention electronically processes the TV image by employing a basic structure of multiple grids overlayed by time-gating on the TV video signal. A coarse grid is used to position a finer grid which forms the track window. The track window grid structure, comprised of cells, is further divided such that each cell contains the smallest quantum of resolution, determined by $2^p$ increments.

Initially, the track window is manually positioned over a desired target as determined by the image on the TV display and a suitable servomechanism. The video display signal is filtered, delay line differentiated, and full wave rectified. The video signal is processed for horizontal information by time gating a given TV scan line and for vertical information by comparing adjacent scan lines at the same horizontal position. If the amplitude of the video signal changes within a cell according to a selected signal transition, that cell is assigned a "mass" of one; otherwise, the cell is assigned a mass of zero. Each cell given a mass of one is further weighted in assignment according to the occurrence of the particular transition within the aforementioned multiple grid structure. For each TV frame scanned within the track window, a summation is made of all cell masses and the sum is divided by the number of cells achieving a mass greater than zero.

As will be seen in the detailed discussion of the invention, the summation procedure yields the centroid of the target image appearing within the track window. Motion of the target within the track window produces a change in the value of the summation from which error signals can be derived to control both horizontal and vertical positioning of the TV camera tracking mechanism.

The superiority of the centroidal tracker of the invention over the prior art tracking systems is evident both in the computation of target centroid and in recognition of the target image contrasted with a background. Digital signal processing permits the generation of precise cursors which indicate the computed target centroid and the track window size. The tracking processing is self normalizing such that changes in track window size are readily accommodated without changes in servoloop constants. This feature permits the operator to select a track window area that is compatible with the size of the desired target and as a consequence minimizes the effects of background clutter.

A distinct advantage of the centroidal tracker occurs in the minimization of dynamic requirements, especially in the case of relative target roll rates. It is noted that the optical line of sight and the center or mass (about which the target rolls) nearly coincide for typical targets. To within the quantum precision, rotations (without translation) about the centroid produce zero error with a centroid tracker. The same is not true for prior art edge trackers, which sense the roll rate as a function of which edge is being tracked and the relative size of the target within the field of view; furthermore, if the initial tracked edge is occluded by the target as the target undergoes a roll maneuver, a new tracking point is required and break lock may occur. By contrast, even though initial errors may occur due to a change in target aspect angle, the operation of the centroidal tracker assures maintenance of lock-on.

The above and other features and objects of the invention will be better understood from the following detailed description of the invention, explanation of mechanization equations and accompanying drawings.

DETAILED DESCRIPTION OF THE INVENTION

Figures 1, 2, 3A, 3B, 3C, 3D:
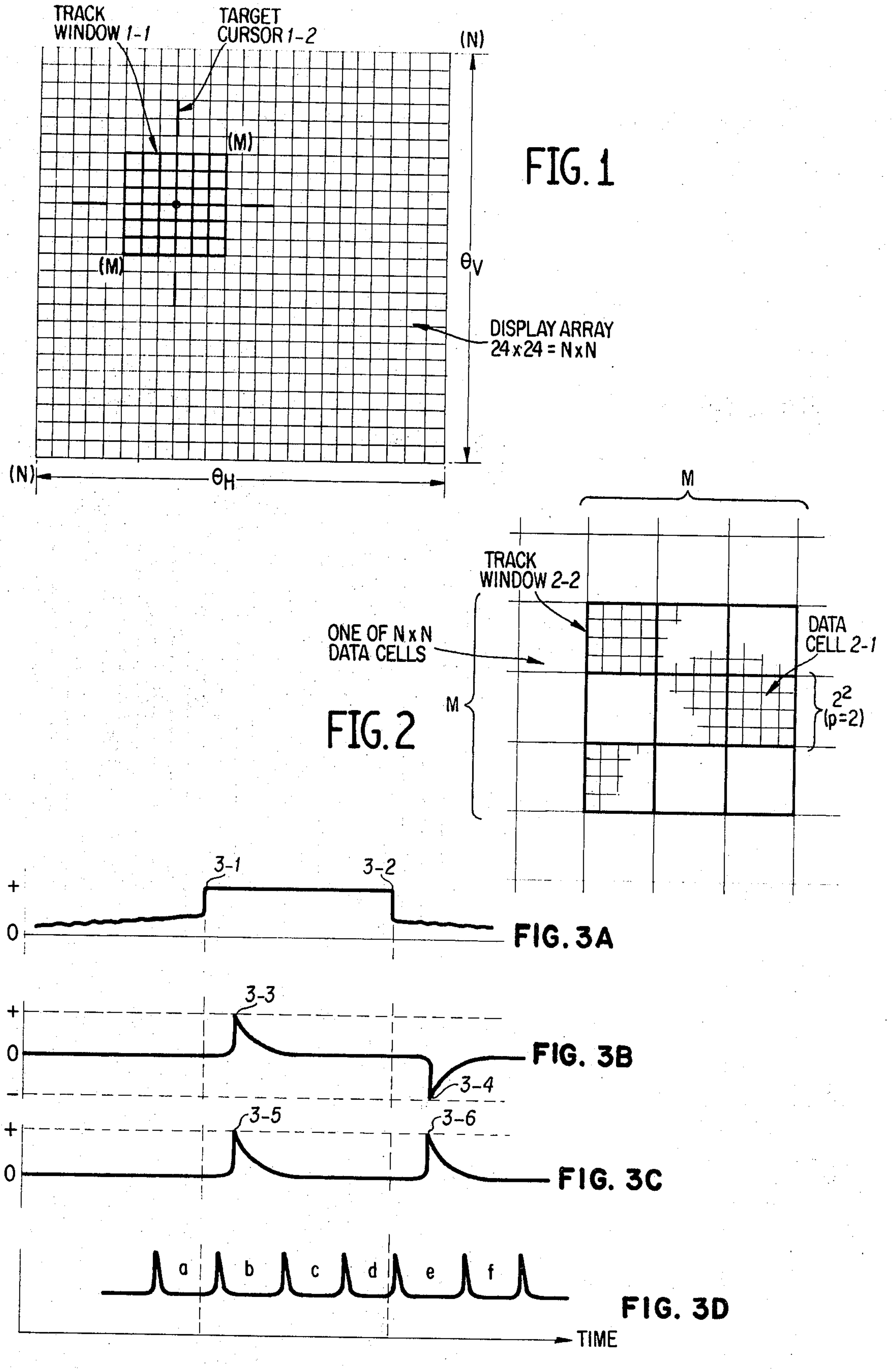
FIG. 1 is a pictorial representation of the display grid and track window grid structures.
FIG. 2 is an enlarged view of data cells within the track window showing the smallest quantum of resolution.
FIGS. 3A to FIGS. 3D illustrate signal waveforms in various stages of signal processing.

The basic structure of the centroidal TV tracker uses a dual grid overlay on the TV display. With reference to FIG. 1, the squares formed by the coarse grid 1—1 are termed data cells and an $N \times N$ array of these cells covers the display. A smaller array of $M \times M$ cells determines the track window, 1–2. Each cell within the track window further is subdivided into $2^p$ increments, where $p$ is an integer.

Thus, for a field of view of $\theta_H$ radians in the horizontal and $\theta_V$ radians in the vertical coordinate directions, the coarse positioning quantum steps are: $q_{HC} = \theta_H/N$ , radians (1)

$$q_{VC} = \theta_V/N \text{ , radians} \tag{2}$$

where $N$ is the number of row or column cells in the display. The resolution provided by cells within the track window is determined by the quantum steps of:

$$q_{HF} = \theta_H/2p{\cdot}N \text{ , radians} \tag{3}$$

$$q_{VF} = \theta_V/2p{\cdot}N \text{ , radians} \tag{4}$$

where, as above noted, $2^p$ determines the smallest quantum and grid structure, and the product of $2^p{\cdot}N$ gives the total number of grid divisions of the window in each of the horizontal and vertical directions. Note the track window quanta are $(M/N)\theta_H$ and $(M/N)\theta_V$ radians respectively, in the horizontal and vertical directions. For illustrative purposes, in FIG. 1, $N = 24$ and $M = 6$.

FIG. 2 illustrates in enlarged detail a portion of a coarse grid 201 containing a track window 2—2 where $M = 3$, and a data cell 2–3 of specific division $2^p$, where $p = 2$.

Initially, the track window is manually positioned over a desired target in the TV display, the $N \times N$ grid encompassing the entire display. A TV display is assumed which scans from left to right, and from top to bottom, and thus in each instance from data cell 1 to cell $N = 24$. A target cursor 1–3 (FIG. 1) is located at the intersection of horizontal data cells number 8 and 9 and the intersection of vertical data cells 9 and 10. The TV video signal corresponding levels of intensity in the display images is processed to measure signal transitions according to criteria, as are discussed subsequently. If a transition occurs within a cell, that cell is assigned a "mass" of one; otherwise, the cell is assigned a mass of zero. Each cell having a mass greater than zero is assigned a weight according to cell coordinates within the track window, as follows.

The track window is ordered as a matrix with $M$ rows and $M$ columns. Row elements are subscripted "$i$" and column elements are subscripted "$j$." A matrix element is identified as $M_{ij}$ such that element $M_{11}$ is found in the left- and top-most corner of the track window.

The first TV scan line within a data cell for which a transition occurs determines the vertical coordinate weight $V_{ij}$:

$$V_{ij} = M/2 + 1 - i - v_{ij}/2^p \tag{5}$$

where $v_{ij}$ is the number of the smallest division within a cell of the tracking window, and thus has a value between 0 and $2^p{-}1$, i.e., $v_{ij} = 0, 1, \ldots 2^p{-}1$, M is an even number and $i, j{=}1, \ldots M$. The horizontal coordinate weight $H_{ij}$, depends upon the one of the possible $2^p$ increments on that scan line within which a transition first occurred:

$$H_{ij} = -M/2 - 1 + j + h_{ij}/2^p \tag{6}$$

where $h_{ij}$ is the number of the division within the cell of the tracking window, and thus has a value between 0 and $2^p{-}1$, — i.e., $h_{ij} = 0, 1, \ldots 2^p{-}1$. If the transition recognized as occuring in a cell comprises a vertical transition only, the horizontal coordinate is taken as $2^p{-}1$.

Though more than one transition can occur in any given cell, only one is recorded according to the rules given above. It is seen in equation (5) that the quantity $(M/2 + 1)$ has the effect of biasing the vertical coordinate weighting to the center of the track window. Likewise in equation (6), the quantity $(-M/2 - 1)$ biases the horizontal coordinate weighting to the center of the track window.

Therefore, from equations (5) and (6), it is seen that a lower value of ($i$) corresponds to a larger positive weighting and a higher value of ($i$) corresponds to a larger negative weighting. Conversely, a lower value of ($j$) corresponds to a larger negative weighting, and a higher value of ($j$) corresponds to a larger positive weighting for horizontal transitions. Matrix positions near the center of the track window, i.e., $i = j = M/2$, give the smallest weighting values. The choice of the weighting equations (5) and (6) allows for identification of unique quadrants as shown by the polarity signs around the track window in FIG. 4.

For example, in a tracking window where $M = 6$ and $p = 3$, and for a transition occurring in the first data cell — i.e., $i = 1, j = 1$, and thus $M_{ij} = M_{11}$ — and in the approximate center thereof (i.e., $v_{ij} = h_{ij} = 4$, for $p = 3$), the vertical and horizontal weighting factors respectively, are derived from equations (5) and (6) as follows:

$$a\begin{cases} W_V = V_{ij} = V_{11} = 6/2 + 1 - 1 - 4/\mathbf{8} = 2\text{-}4/8 = 2\tfrac{1}{2} \\ W_H = H_{ij} = H_{11} = -6/2 - 1 + 1 + 4/\mathbf{8} = -2\text{-}4/8 = -2\tfrac{1}{2} \end{cases}$$

Similarly, it can be shown that:

b. for $i = 2, j = 2$, $W_V = +1\tfrac{1}{2}$ $W_H = -1\tfrac{1}{2}$
c. for $i = 3, j = 3$, $W_V = +\tfrac{1}{2}$ $W_H = -\tfrac{1}{2}$
d. for $i = 4, j = 4$, $W_V = -\tfrac{1}{2}$ $W_H = +\tfrac{1}{2}$ In the foregoing examples, since a transition at the approximate center of the cell was assumed, $h_{ij} = v_{ij} = 4$ was used. Additional weighting, it will be appreciated, is offered by these terms of equations (5) and (6), involving $v_{ij}$ and $h_{ij}$. With increasing $v_{ij}$, a more negative $W_V$ value results which is consistent with a vertical scanning from top to bottom of the display. Also, an increasing value of $h_{ij}$ affords a larger $W_H$ value, and thus a weighting factor displacing to the right, in agreement with a horizontal scan from left to right of the display. For example, if $v_{ij} = h_{ij} = 6$, instead of 4 in examples (*a*) through (*d*) above, a weighting increment of −¼ is added to each of resultant weighted values $W_V$, and +¼ to $W_H$.

It will be appreciated that the selection of $N$ as an even integer, as is desirable for processing purposes, does introduce an ambiguity, or more precisely a quantum error, in defining, for example, the "center" of a data cell. Specifically, in the above example, $h_{ij} = v_{ij} = 4$ as the "center" really defines one of the four sub-cells or divisions immediately adjacent the true geometric "center" of an $M^{th}$ data cell. Such quantum errors, however, tend to be averaged and thus reduced in effect for mass points over the total target.

The centroid of a target image within the track window is found by summing all data cells with their weighting multipliers and dividing by the number $S$, of mass "1" cells to give a horizontal displacement, or "error," $E_{HF}$ and a vertical displacement, or error, $E_{VF}$ from the center of the track window, as follows:

$$E_{HF} = \sum_{i=1}^{M} \sum_{j=1}^{M} \frac{H_{ij}}{S} \quad (7)$$

$$E_{VF} = \sum_{i=1}^{M} \sum_{j=1}^{M} \frac{V_{ij}}{S} \quad (8)$$

where:

$$S = \sum_{i=1}^{M} \sum_{j=1}^{M} M_{ij} \text{ (whereby } 1 \leq S \leq M^2) \quad (9)$$

where:

$$E_{HF} = \sum_{i=1}^{M} \sum_{j=1}^{M} \frac{H_{ij}}{S}$$

From equations 7 and 8 and the foregoing, it will be appreciated that the errors are measured relative to the center of the track window, and are determined to the nearest quantum step within the window matrix (i.e., to the nearest one of the subdivisions $2^p$ in each of the (*i*) and (*j*) directions within the data cell) — and thus in accordance with $q_{VF}$ and $q_{HF}$ of equations (3) and (4).

The centroid displacement errors computed above are added to the coarse prepositioning errors of the track window, the latter being given by:

$$E_{HC} = -N/2 + k \quad (10)$$

$$E_{VC} = N/2 - r \quad (11)$$

where $k$ is the center of the track window in the horizontal direction of the display, from position $k = M/2$ to N − $M/2$ (i.e., in FIG. 1 and for $N = 24$, $M = 6$, $3 \leq k \leq 21$) and $r$ is the vertical direction in the display, also from position $r = M/2$ to $N - M/2$ (i.e., $3 \leq r \leq 21$).

The total target displacement errors relative to the center of the display are computed from:

$$E_H = E_{HF} + E_{HC} \quad (12)$$

$$E_V = E_{VF} + E_{VC} \quad (13)$$

The target errors are computed once during each TV frame time and converted from digital to analog (D/A) to produce error signals which are supplied to the TV camera servomechanism for control thereof. The track window is repositioned by the servomechanism to maintain $|E_{HF}| < 1$ and $|E_{VF}| < 1$ – i.e., such that the track window center coincides with the target centroid.

The geometric shape of the target image is determined from amplitude transitions in the TV video signal. The display video signal is continuously filtered, delay line differentiated and full wave rectified. To illustrate this processing, several waveforms are shown in FIGS. 3A to 3D. Waveform A typifies a video signal corresponding to a horizontal scan line where time increases to the right. In waveform A, display background level to left of point 3–1 has a relatively low amplitude. At point 3–1 the target returns a high amplitude signal which persists for the breadth of the target to point 3–2 where the amplitude again falls to the background level. This video signal is delay line differentiated as shown in waveform B such that step increase 3–1 is produced at 3–3. In keeping with the principles of differentiation, waveform B decreases to zero amplitude to the right of 3–3 until step decrease 3–2 occurs, and which produces a negative going step shown at 3–4. Rectification of waveform *B* yields waveform *C* such that steps 3–5 and 3–6 correspond to the original signal transitions 3–1 and 3–2, although slightly time-displaced therefrom. Waveform *D* shows several possible gating times, a through *f*, which might be used to relate transitions to horizontal displacement. In FIGS. 3A to 3D, transitions would be recorded as occurring in gating cells *b* and *e*. Relating the gating cells to data cells of the aforediscussed grid structure of a track window, data cells corresponding to gates *b* and *e* would be assigned a mass of "1" while the remaining cells would receive a mass assignment of "0."

Specifically, the amplitude levels of waveform C may be converted by A/D circuitry to assign the "1" and "0" values, for each cell or gating position, and stored in a digital shift register. Waveforms A resulting from each scan line are processed identically so that amplitude levels may be compared on a scan line to scan line basis to determine whether signal amplitude transitions have occurred in the vertical direction of a data cell.

Figure 4:
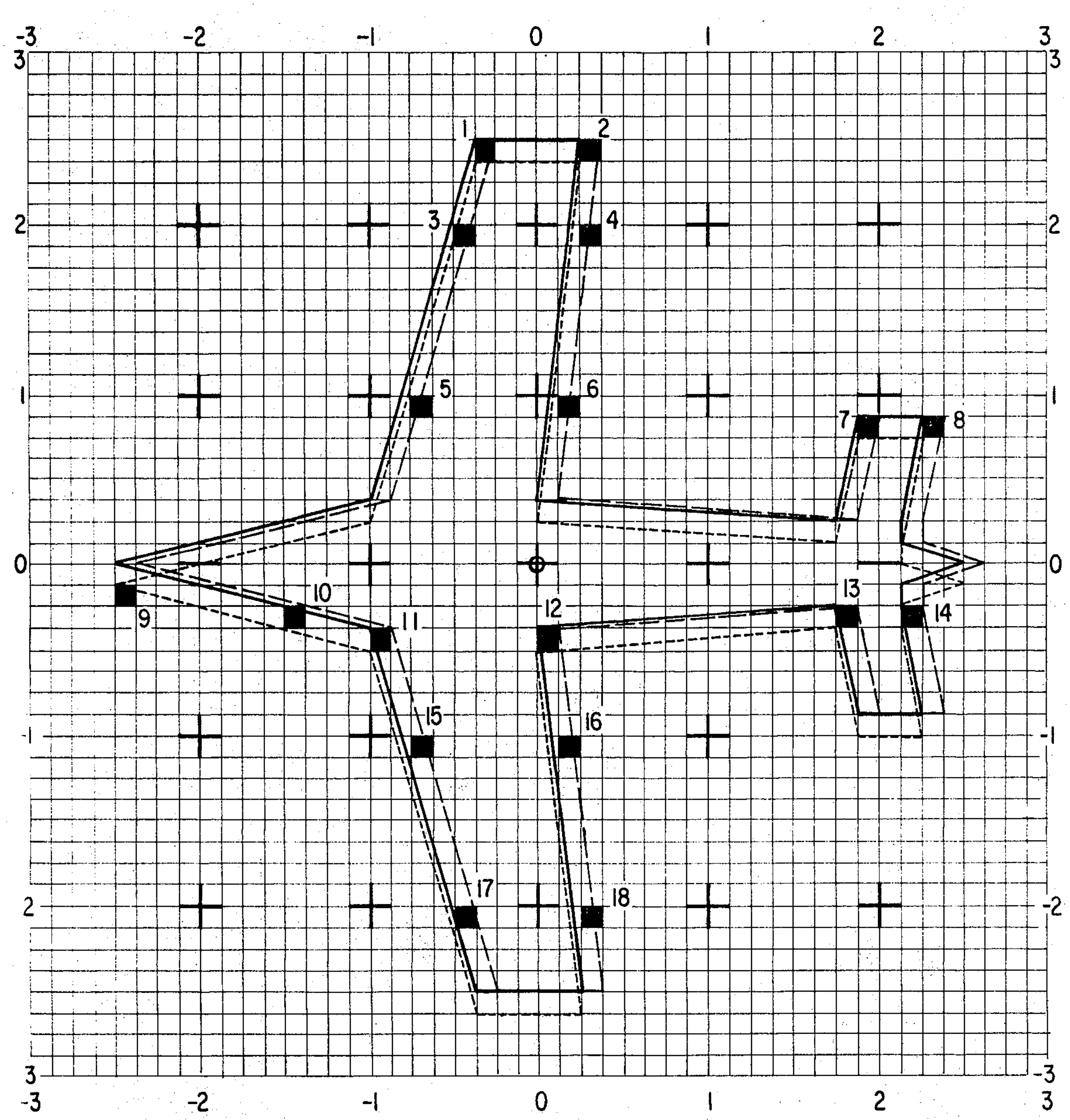
FIG. 4 is an example of target detection and centroidal tracker operation.
Figure 5:
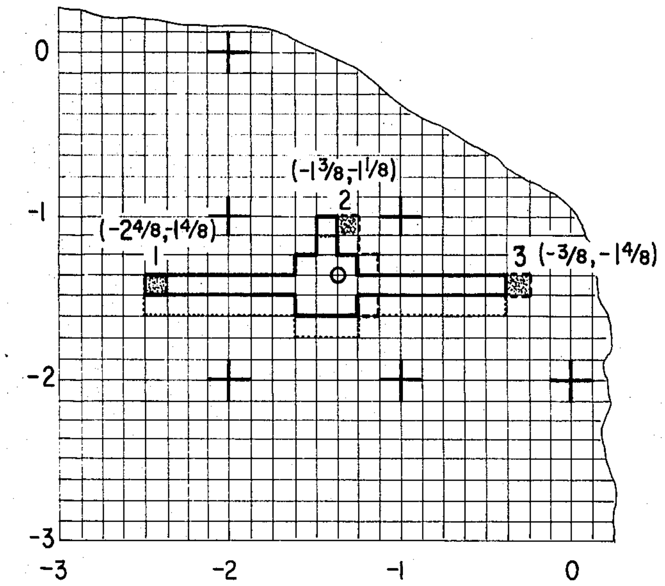
FIG. 5 is another example of target detection illustrating error signal generation.

FIGS. 4 and 5 illustrate graphically the detection of targets within a TV display and the assignment of mass cells having "1" values, according to the invention. In the figures, the patterns are shifted one sub-unit to the right and one sub-unit down to simulate the effects of the delay line differentiator in the horizontal processing and the line to line comparisons in the vertical processing. For the figures, $N = 24$, $M = 6$ and $p = 3$ (i.e., eight subdivisions per data cell). Note that the target of FIG. 4 has been centered in the track window, whereas the target of FIG. 5 is displaced from the center of the track window.

In FIG. 4, mass points 1 through 8 and 10 through 18 have all resulted from horizontal transitions, indicated in the figure by darkening of the smallest quantum step, or subdivision, of the data cell in which the transition occurred. Mass points 9 and 10 have resulted from vertical only detections. Applying the rules of weighting, the target centroid is computed to fall at the center of the track window.

In FIG. 5, a small target is detected and given three mass "1" points as shown. The corresponding horizontal and vertical weighting for these points are also shown. It is readily seen that error signals can be derived from the computed centroid to steer the tracking window. Note the negative values of the weighting factors are consistent with the rules established and follow directly from equations (5) and (6).

Figure 6:
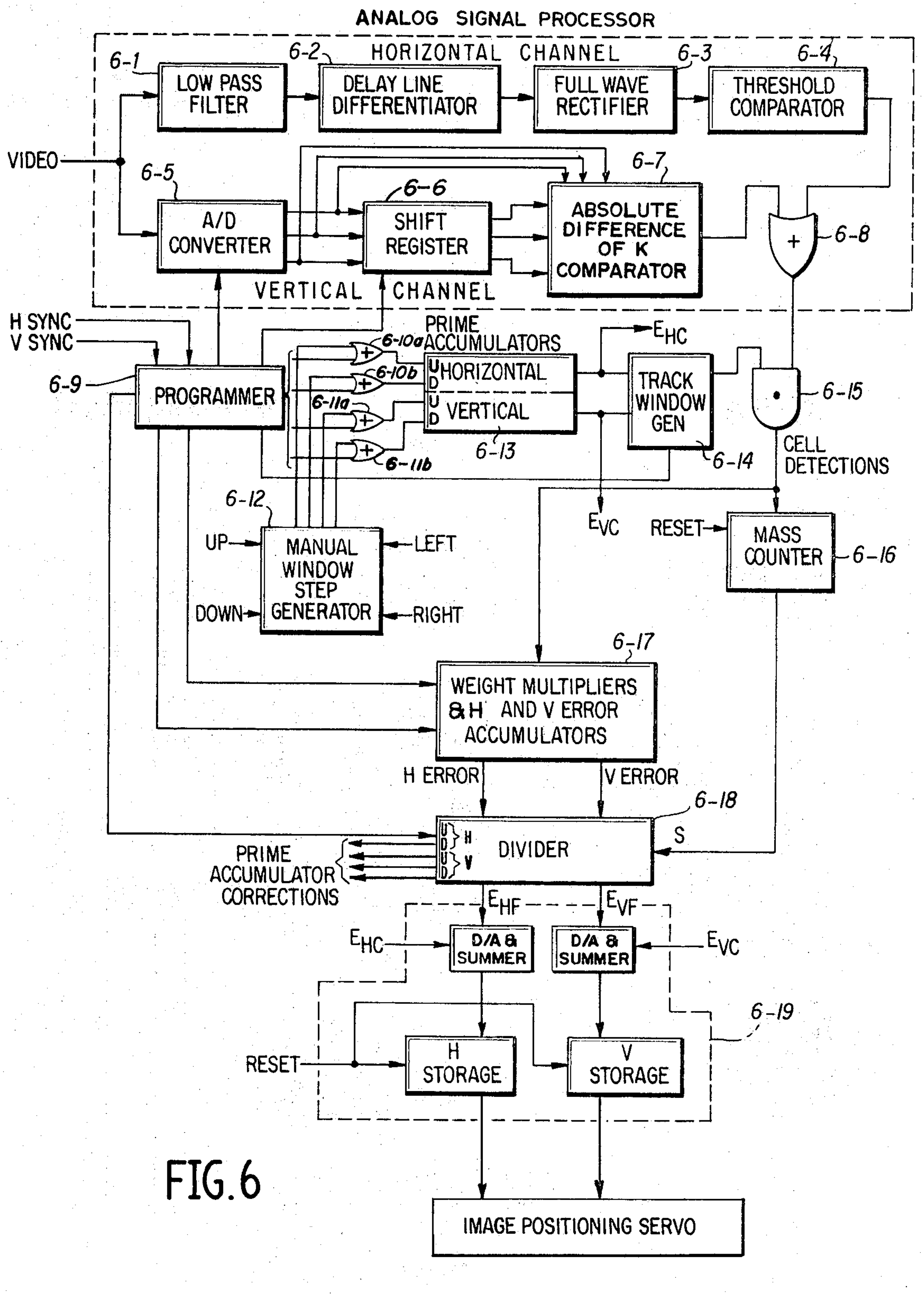
FIG. 6 is a block diagram of the centroidal tracker signal processor of the invention.

Digital circuitry to implement the invention is now discussed referring to FIG. 6. An analog signal preprocessor comprising elements 6–1 through 6–8 determines signal transitions occurring in the TV video signal. Either a horizontal transition or a vertical comparison will produce a digital state change in OR element 6–8. The relating of transitions to data cells for assignment of a mass = 1 is accomplished in AND gate 6–15 receiving the output of TRACK WINDOW GENERATOR 6–14 and the output of OR element 6–8. A logical 1 output of element 6–15 is recorded in the MASS COUNTER 6–16, and a weighting factor is computed in the WEIGHT MULTIPLIER and H and V ERROR ACCUMULATORS, shown at 6–17. Division of the sum of H errors and of the sum of V errors from element 6–17 by factor S, supplied from MASS COUNTER 6–16 is performed in DIVIDER 6–18. DIVIDER 6–18 produces, as outputs, PRIME ACCUMULATOR corrections, and also horizontal and vertical error signals $E_{HF}$ and $E_{VF}$, in digital form, which are combined with $E_{HC}$ and $E_{VC}$, respectively, in corresponding D/A converters and summers to provide error correction analog signals to corresponding *H* and *V* storage circuits for driving an image positioning servomechanism, as shown in block 6–19.

The relationship of the tracking window to the TV display coordinates of the prime matrix (i.e., of $N \times N$ cells) and the computed target centroid is stored digitally in the horizontal and vertical PRIME ACCUMULATORS 6–13 for both horizontal and vertical coordinate control of the track window in accordance with error outputs $E_{HC}$ and $E_{VC}$. OR gates 6-10*a*, 6-10*b* and 6-11*a*, 6-11*b* permit an operator to manually position the tracking window by appropriate setting of the MANUAL WINDOW STEP GENERATOR 6-12. PROGRAMMER 6–9, in response to the horizontal (*H*) and vertical (*V*) sync signals of the video display signal, provides the time reference for the signal processor to synchronize horizontal scanning for gating and horizontal error tracking of a target, and to synchronize vertical framing weighting computations, vertical transition detection and vertical error tracking of the target.

In more detail and referring, in particular, first to the analog signal preprocessor section of FIG. 6, elements of the horizontal and vertical processing channels are described. A video signal, such as shown in waveform A of FIG. 3, is processed simultaneously in parallel HORIZONTAL and VERTICAL channels, for detecting amplitude changes or transitions in horizontal scanning and amplitude differences between corresponding horizontal positions of successive vertically displaced horizontal scans. In the horizontal channel, the video signal is filtered in LOW PASS FILTER 6-1, differentiated in DELAY LINE DIFFERENTIATOR 6-2 and rectified in FULL WAVE RECTIFIER 6-3. At this point a waveform similar to C in FIG. 3 is produced. To quantify the selection of transitions the rectified waveform is compared against a given amplitude threshold in THRESHOLD COMPARATOR 6-4. In the vertical channel, the amplitude of the video signal is converted to digital values of "1" or "0" by A/D converter 6-5, for each data cell, as determined by the gating action of the PROGRAMMER 6-9. An amplitude record is maintained for each data cell of the first of each two successive, or adjacent, vertically displaced horizontal scan lines in SHIFT REGISTER 6-6 and comparisons of the stored digital magnitudes for corresponding cells of the adjacent scan lines are made in unit 6-7, labeled ABSOLUTE DIFFERENCE OF K COMPARATOR. A horizontal transition output satisfying the threshold requirements of comparator 6-4 or an amplitude difference between the stored digital values for corresponding cells of adjacent scan lines in the vertical direction, or both, will supply a mass value of 1 to the gating circuitry.

The signal processor contains two, i.e., horizontal and vertical, prime accumulators 6-13 for storage and readout of the track window position within the total or prime ($N \times N$) data cell array. Each accumulator is stepped up or down, within the track window constraints, to determine the initial track window position; the accumulated values are corrected once each field after a centroid measurement has been made.

Data is processed as each row of cells within the track window has been scanned (*M* out of *N* cells and $2^p$ horizontal scan lines for each cell). As each cell is scanned, the appropriate weight factor for each mass point is assigned as a function of the particular cell and stored in two additional (*H* error and *V* error) accumulators 6-17. The mass 1 counter 6-16 accumulates a count of the total number of cell detections within the track window, to establish the value S. After *M* rows of data cells have been scanned (i.e., the entire window), the accumulated *H* and *V* errors are sequentially divided by the factor S in divider 6-18. Coarse *H* and *V* errors are then added, with appropriate sign, to the values stored in the corresponding *H* and *V* prime accumulators 6-13. The fractional remainders resulting from the division by divider 6-18 are D/A converted and are added to D/A converted outputs of the prime accumulators 6-13, these combined functions being afforded by the D/A elements of block 6-19. The *H* and *V* error signals are filtered and stored in the *H* and *V* storage elements of block 6-19, for supply as analog control signals to an image positioning servosystem, thereby completing the loop for each frame. The *H* and *V* storage elements are reset at the end of each frame, thereby to provide new image positioning error signals for each frame in succession.

The foregoing disclosed embodiment of the invention achieves certain efficiencies by affording dual processing channels as to the data cells of the window and as to the sub-units of each cell, with respect to each detected transition (as to which a mass "1" value is assigned). An alternative embodiment may eliminate the grouping of the sub-units into "cell," and instead utilize the same mass assignment technique while defining position information only as to the sub-units (i.e., the smallest quantum units, or steps) for the entire window. In essence, whereas a data cell of the first embodiment included a matrix of the quantum steps, or sub-units therein, each data cell in this embodiment directly corresponds to a quantum step. Accordingly, for the window dimensions, etc., of the foregoing embodiment, $M'$ = total quantum steps in window and, for the specific configuration of FIG. 1 wherein $M = 6$ and $p = 3$ (or $2^p = 8$)

$$M' = 48 = M \times 2^p.$$

Similarly, $N'$ would now be defined as $N \times 2^p$ relative to the first embodiment, i.e., the major grid would now be defined as a function of the total number of quantum steps. Equations (5) and (6) then are simplified to:

$$V_{ij} = (M' + 1/2) - i \qquad (5')$$

$$H_{ij} = (-M' - 1/2) + j \qquad (6')$$

The incremental terms involving $v_{ij}$ and $h_{ij}$ of equations (5) and (6) accordingly are eliminated, since the window is treated now as containing only the total of the quantum steps. Equations (7) to (9), modified as to $M'$, and equations (10) to (13) are again applicable.

Numerous modifications and adaptations of the system of the invention will be apparent to those skilled in the art and thus it is intended by the appended claims to cover all such modifications and adaptations which fall within the true spirit and scope of the invention.

What is claimed is:

1. A method for tracking a target in accordance with defining the target centroid in a display thereof, comprising:

defining a track window of a desired size for encompassing a target to be tracked, and including a corresponding predetermined number of quantum steps identified by the window coordinates and defining data cells, locating the track window in relation to the display coordinates to encompass the target, identifying transitions of the displayed target relative to the display background and assigning mass values to the window cells distinguishing those cells in which a transition is identified, weighting the cells having transition identifying mass values in accordance with their coordinate positions in the track window, effecting a summation of all such weighted cells separately for each coordinate and relative to the totality of weighted cells thereby to define the target centroid relative to the center of the window.

2. The method of claim 1, further comprising adjusting the window size to a minimum consistent with encompassing the target.

3. The method of claim 1 wherein the step of identifying transitions comprises generating a video display signal corresponding to scanning of the target to be displayed in successive scan frames of horizontal, successive vertically displaced lines, and processing the video display signal and recognizing signal transitions therein as corresponding to transitions in the displayed target relative to backgound, for identifying the target transitions.

4. The method of claim 3 wherein the horizontal and vertical directions of scan correspond to the horizontal and vertical coordinates of the display and the track window and wherein quantum steps and hence cells in each coordinate are identified in accordance with the timing function of the scan in those corresponding directions, and wherein the identifying step further comprises detecting transitions in the video display signal during a horizontal line direction of scan for identifying horizontal transitions in the target and identifying the cell to which that horizontal transition is related in accordance with that time function, for the assignment of mass values identifying target transitions as to those cells, and comparing the video horizontal scan line signal for each horizontal line with the next preceding horizontal line in accordance with the corresponding quantum steps thereof, for each line in succession, to identify vertical transitions in any quantum step of that currently scanned horizontal scan line wherein there is a difference between the presence or absence of detected horizontal transitions as to the corresponding quantum step of the previous line, for assigning mass values to cells for identifying vertical transitions.

5. The method of claim 1, further comprising determining a total target displacement error value for each display coordinate as a combined function of a coarse error value of the track window position relative to the display coordinates and a fine error value of the target centroid relative to the window coordinates.

6. The method of claim 5 wherein the target is sensed by sensing means for producing the display of the target and further comprising:

supplying the total target displacement error values to a positioning control means for said sensing means to center the target in the display, and responding to the gross error values generated by a target displacement during centering thereof in the display for displacing the track window to approach coincidence of the track window center, the display center, and the target centroid.

7. The method of claim 6 wherein locating of the track window is initially performed by manual positioning of either the track window or the image in the field of view by positioning the television camera.

8. The method as recited in claim 1 wherein the window includes a matrix of $M$ cells and each cell includes a matrix of $2^p$ predetermined quantum steps, where $p = 1, 2, 3, \ldots$, in each of the vertical ($j$) and horizontal ($i$) coordinate directions of the window, and said weighting step is performed for each transition in accordance with $$V_{ij} = (M/2) + 1 - i - (V_{ij}/2^p)$$

$$H_{ij} = -(M/2) - 1 + j + (h_{ij}/2^p)$$

for the vertical and horizontal coordinate weights, respectively, $v_{ij}$ and $h_{ij}$ defining the quantum step in the cell at which the transition is identified and each having a value of from 0 to $2^p - 1$.

9. The method of claim 8 wherein the summation step is performed in accordance with:

$$E_{HF} = \sum_{i=1}^{M} \sum_{j=1}^{M} \frac{H_{ij}}{S}$$

$$E_{VF} = \sum_{i=1}^{M} \sum_{j=1}^{M} \frac{V_{ij}}{S}$$

where:

$$S=\sum_{i=1}^{M}\sum_{j=1}^{M} M_{ij} \text{ (whereby } 1 \leq S \leq M^2\text{)}$$

thereby defining a displacement error value of the target relative to the track window center, in the horizontal ($H$) and vertical ($V$) coordinate directions.

10. The method of claim 9, further comprising determining total target displacement error values in accordance with:

$$E_H = E_{HF} + E_{HC}, \text{ and}$$
$$E_V = E_{VF} + E_{VC}$$

where $$E_{HC} = -N/2 + k$$
$$E_{VC} = +N/2 - r$$

and wherein each of $k$ and $r$ are the centers of the track window in the horizontal and vertical coordinate directions, respectively, and range from position $M/2$ to position $N - M/2$ and $N$ is the equivalent number of cells in each coordinate of the display.

11. The method of claim 1 wherein the window includes a matrix of $M'$ cells, each cell being defined by a single quantum step in each of the coordinates and wherein said weighting step for each of the vertical and horizontal transitions is performed in accordance with, respectively:

$$V_{ij} = (M + 1/2) - i$$
$$H_{ij} = -(M - 1/2) + j.$$

12. The method of claim 11 wherein the summation step is performed in accordance with:

$$E_{HF}=\sum_{i=1}^{M'}\sum_{j=1}^{M'} \frac{H_{ij}}{S}$$

$$E_{VF}=\sum_{i=1}^{M'}\sum_{j=1}^{M'} \frac{V_{ij}}{S}$$

where:

$$S=\sum_{i=1}^{M'}\sum_{j=1}^{M'} M_{ij} \text{ (whereby } 1 \leq S \leq M')^2$$

thereby defining a displacement error value of the target relative to the track window center, in the horizontal ($H$) and vertical ($V$) coordinate directions.

13. The method of claim 12, further comprising determining total target displacement error values in accordance with:

$$E_H = E_{HF} + E_{HC}, \text{ and}$$
$$E_V = E_{VF} + E_{VC}$$

where $$E_{HC} = -N'/2 + k$$
$$E_{VC} = +N'/2 - r$$

and wherein each of $k$ and $r$ are the centers of the track window in the horizontal and vertical coordinate directions, respectively, and range from position $M'/2$ to position $N' - M'/2$, and $N'$ is the equivalent number of cells in each coordinate of the display.

14. A system for tracking a target wherein the target is scanned in successive frames of horizontal, vertically displaced scan lines for producing a video signal affording a display thereof, and wherein a predetermined number of quantum steps are defined in each such line as a time function of the horizontal line scan rate, comprising:

video signal processing means including a horizontal channel for detecting signal transitions corresponding to transitions between a target being scanned and background to define detected horizontal transitions in relation to the quantum steps in each line, a vertical channel including means for storing an indication of detected transitions in accordance with the quantum steps of a horizontal line and means for comparing the stored transition indications with detected transitions of a successive horizontal line in accordance with the corresponding quantum steps thereof to define detected vertical transitions in relation to the quantum steps in the successive horizontal line as to each quantum step wherein a difference comparison obtains, a track window generator for defining a track window as a function of a predetermined number of quantum steps in a horizontal line scan direction for a predetermined number of such horizontal scan lines contained within the scanning frame, means defining cells with said window as a function of said quantum steps of the window, means responsive to the detection of either a vertical or a horizontal transition by said processing means for assigning a target detection mass value to the corresponding cell, and means for computing from the assigned target detection mass values the centroid of the target in the display.

15. A system as recited in claim 14 wherein said horizontal channel includes means for differentiating and fullwave rectifying the horizontal scan video signal to produce said transition signals, and threshold comparison means responsive to the transition signals to produce outputs identifying the detected target transitions.

16. A system as recited in claim 14 wherein said vertical channel includes means for digitizing the horizontal scan video signals at the quantum step rate and in accordance with amplitude levels thereof corresponding to and distinguishing scanning of a target versus scanning of background for all quantum steps of each line to provide digital signals for the quantum steps, and means for storing the digital values of a given horizontal scan line and comparing the digital values for the corresponding quantum steps of a successive scan line to identify vertical transitions at the quantum steps of the current scan line as to which a difference comparison obtains.

17. A system as recited in claim 14 wherein there is further provided means responsive to the computed centroid of the target in the display for producing error signals as a function of displacement of the target centroid from the center of the display, and an image positioning servomechanism responsive to the error signals from said computing means for centering the target in the display.

18. A system as recited in claim 17, further comprising means for manually locating the track window initially to encompass a target of the display, and said computing means includes means responsive to the error signals for supplying displacement signals to the track window generator for displacing the track window in the display in accordance with centering of the target therein.

* * * * *